United States Patent [19]
Smith et al.

[11] Patent Number: 5,315,650
[45] Date of Patent: May 24, 1994

[54] CALLER IDENTIFICATION TRANSMIT PATH LIMITER

[75] Inventors: Earl L. Smith, Downers Grove; Van Nguyen, Wheaton, both of Ill.

[73] Assignee: Teltrend Inc., St. Charles, Ill.

[21] Appl. No.: 56,678

[22] Filed: May 3, 1993

[51] Int. Cl.⁵ .................. H04M 1/00; H04M 9/00
[52] U.S. Cl. ............................ 379/399; 379/387; 379/142; 370/32; 370/32.1; 370/110.1
[58] Field of Search ............. 379/399, 387, 142; 370/32.1, 110.1, 32

[56] References Cited
PUBLICATIONS

Brochure excerpt, 8-Bit Embedded Controller Handbook, Intel Corporation, 1991.
Brochure excerpt, Data Book–Microcontroller, Fifth Edition, OKI Semiconductor, Jun. 1990.
Brochure excerpt, Integrated Circuits Data Handbook–80C51–Based 8-Bit Microcontrollers, Signetics Company–Philips Semiconductors, Feb. 1992.
Brochure excerpt, Telecommunications Databook, National Semiconductor Corporation, 1992 Edition.

*Primary Examiner*—James L. Dwyer
*Assistant Examiner*—J. M. Saint-Surin
*Attorney, Agent, or Firm*—Allegretti & Witcoff, Ltd.

[57] ABSTRACT

A transmit path limiting circuit that allows other equipment, such as a caller identification device, to more readily decipher information signals on a telephone line. The circuit includes a ring detector, register, and controller. The ring detector senses that a call is incoming to the telephone and responsively provides an initiation signal. The register normally transmits outgoing signals from the telephone to the telephone network. After receiving the initiation signal, however, the controller enables the register, for a predetermined interval, to transmit a quiet code in lieu of any signal being transmitted from the telephone. Consequently, reflected noise is lowered during the predetermined interval, so that the caller identification box may more easily interpret data on the telephone line.

7 Claims, 2 Drawing Sheets

CALLER IDENTIFICATION TRANSMIT PATH LIMITER

BACKGROUND OF THE INVENTION

The present invention relates generally to conditioning elements for telecommunications transmission facilities and, more particularly, to a transmit path limiting circuit for a caller identification device. The digital telecommunications transmission facilities include a central office which may transmit digital data signals over digital transmission lines, remote terminal channel units, and customer premises. Typically, the signals are sent over transmission lines differentially on two pairs of cables.

The Bell telephone system in the United States, for example, has widely utilized digital "D" multiplexing code modulation systems. A "D" channel bank, for example, commonly provides multiple DS-1 signals that are carried on a T-1 transmission system. One pair of cables is provided for each direction of transmission.

The central office provides a digital data signal transmitted on two pairs of cables. The digital signals are then transmitted to the remote terminal channel unit. The digital data is then converted to an analog signal and provided on a two-wire ("tip-ring" conductor pair) to the customer's premises. The remote terminal unit includes a hybrid circuit that interfaces a two-wire transmit signal and a two-wire receive signal (a four-wire circuit) to the tip-ring pair.

The customer's premises may include a caller identification box which interprets information sent by the central office regarding the party originating the call. Such information is normally found in the signal provided to the customer's telephone after the first ring of a telephone being initiated.

Some equipment, such as the caller identification box, may not provide a substantial load on the circuit. The analog signal provided to the telephone and caller identification box may be looped back along the tip ring conductor pair to the remote terminal channel unit. The reflected signal may then be processed by the transmission line system, much in the same way that any other analog telephone signal coming from the telephone would be processed.

The reflected signal may then be retransmitted back along the transmission facilities to, for example, the central office. The central office may then loop back the signal toward the customer's premises, treating it as a significant digital data signal, even though it is, in fact, only a reflection or "echo," of the signal sent to the customer premises. Such reflected signals impose noise on the transmission lines, which may interfere with a caller identification box's ability to interpret the telephone number data on the telephone lines. Such data is typically sent immediately following the first ring of a call.

SUMMARY OF THE INVENTION

In a principal aspect, the present invention relates to a caller identification transmit path limiter for a digital carrier transmission line system. The system includes a customer loop telephone line and a digital carrier transmission line. The limiter includes an initial ring detector, an analog to digital converter, a register, and a controller.

The ring detector senses that a call is being received by the telephone, via a digital carrier transmission line. The detector responsively produces an initiation signal.

Further, a telephone signal on the customer loop telephone line (sent by the telephone) is then also converted, by the converter, from an analog to a digital form and transmitted to the register as an intermediate digital signal. The register receives the intermediate digital signal and responsively transmits a digital data signal to the data carrier transmission line, for forwarding toward the central office.

The controller is interconnected to both the initial ring detector and the register. The controller receives the initiation signal from the ring detector, which indicates that a call is being placed to the telephone. Thereafter, for a predetermined interval (or period of time), the controller substitutes a quiet code in the register, such that substantially no noise-inducting data is transmitted by the remote terminal unit to the central office. Accordingly, signal reflection is avoided, which would adversely affect a caller identification box's ability to interpret data.

Thus, an object of the present invention is an improved transmit path signal for use with a digital transmission line system. Yet another object is an improved hybrid circuit that more reliably and economically allows a caller identification box to decipher the identity of a caller to a telephone. These and other objects, features, and advantages of the present invention are discussed or are apparent in the following detailed description.

BRIEF DESCRIPTION OF THE DRAWINGS

A preferred embodiment of the present invention is described herein with reference to the drawings wherein.

DETAILED DESCRIPTION OF THE PREFERRED EMBODIMENT

Figure 1:
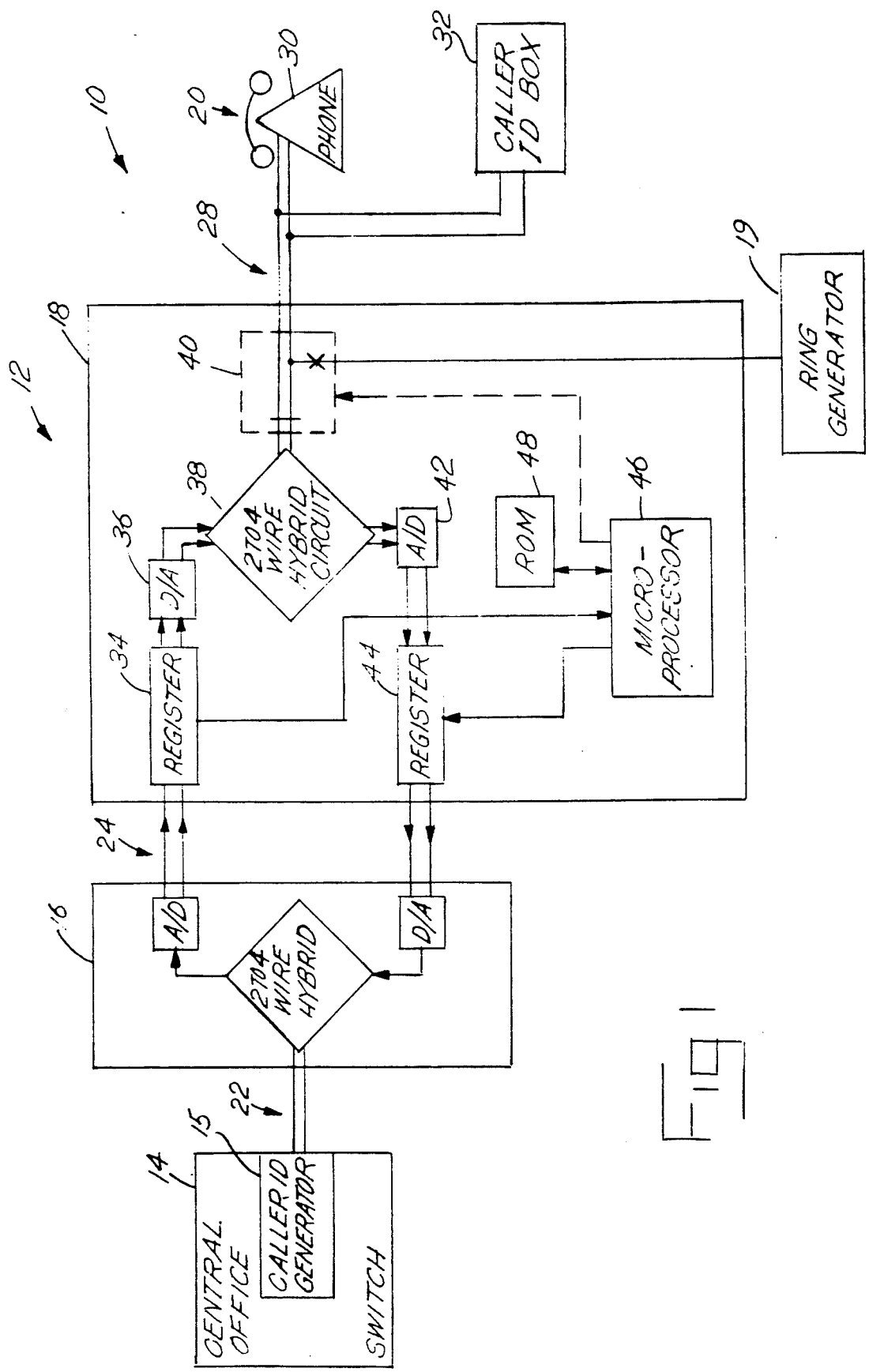
FIG. 1 is a block diagram showing a preferred embodiment of the present invention.
Figure 2:
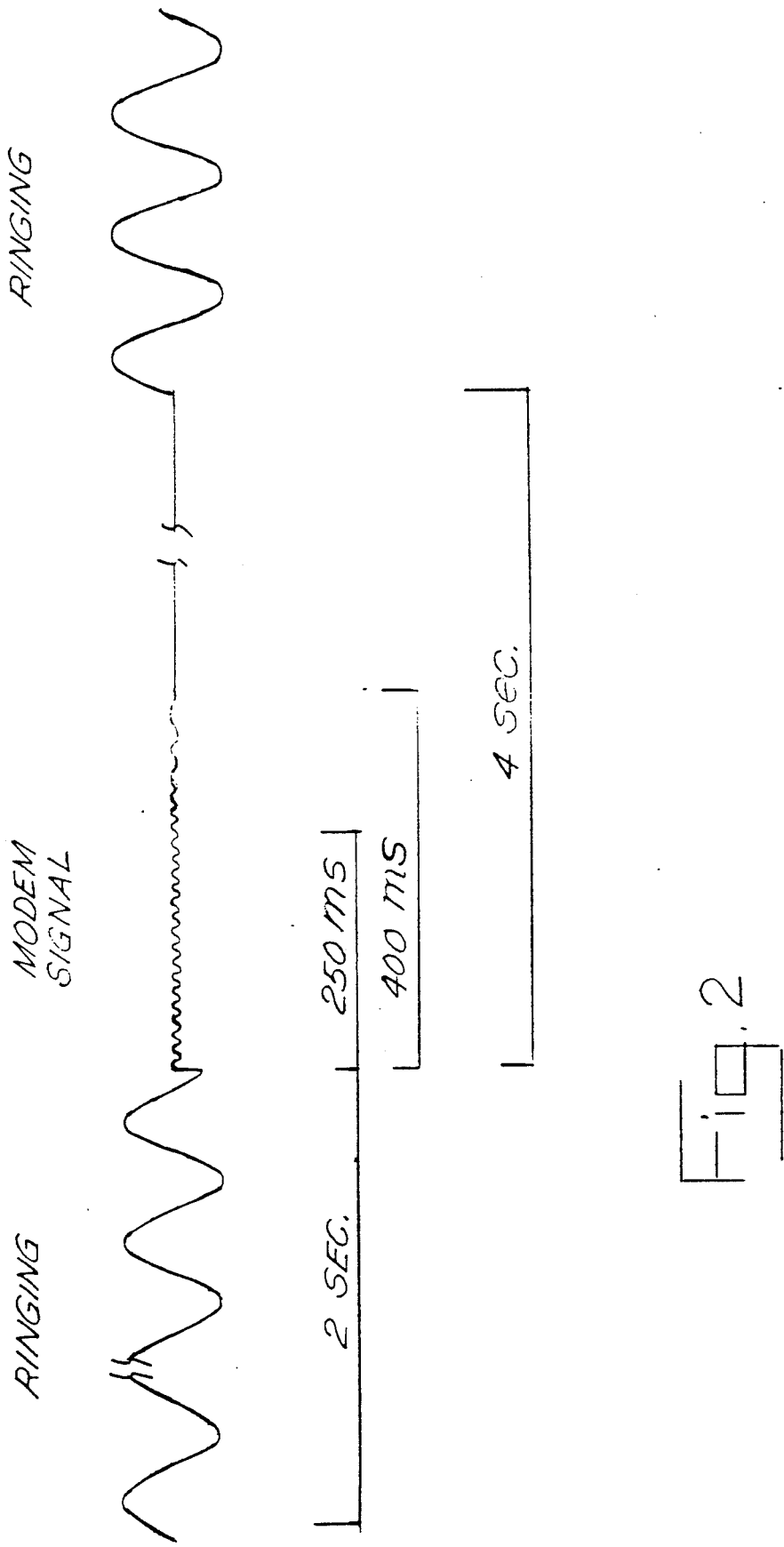
FIG. 2 is a graph showing a ring sequence encountered by the preferred embodiment shown in FIG. 1.

Referring to FIGS. 1-2, the preferred embodiment of the present invention is shown as a transmission path limiter 10 for use with a digital telecommunication transmission line system 12. As shown in FIG. 1, the digital telecommunication transmission line system includes a central office 14, central office channel unit 16, remote terminal channel unit 18, ring generator 19, and customer premises 20.

The central office 14 and channel unit 16 are interconnected with a two wire analog span 22. The central office channel unit 16 is interconnected to the remote terminal channel unit 18 via a pair of receive transmission lines 24 and a pair of transmission lines 26. The central office 14 includes a caller identification generator 15.

The remote terminal channel unit 18 and customer premises 20 are interconnected with a two-wire analog line (tip-ring conductor) 28. The ring generator 19 is interconnected to the remote terminal channel unit 18. The customer premises 20 includes a telephone 30 as well as a caller identification box 32.

The remote terminal channel unit 18 includes a first register 34, digital to analog converter 36, two-to-four-wire hybrid circuit 38, dual action relay 40, analog to digital converter 42, second register, 44, and controller 46. The controller 46 includes a microprocessor 46, which has access to a quiet code in a Read Only Memory 48. Such a quiet code, when sent via the transmit transmission line 26, results in a signal indicating that no data is being sent via the transmit transmission line 26, thus resulting in substantially no echo being reflected by the central office 14 down the receive transmission line 24 back toward the customer premises 20.

The first and second registers 34, 44, as well as the quiet code, are both interconnected to the microprocessor 46. The first register 34 acts as an initial ring detector for sensing that a call is incoming to the telephone 30. In this case, the microprocessor 46 is alerted, and the relay 40 is activated.

The register 34 provides an initiation signal to the microprocessor 46, so that it is advised that a call is being placed to the telephone 30. The analog signal being sent, via the receive transmission line 24, is converted by the digital to analog converter 36. The incoming signal is then sent, in analog form, to the hybrid circuit 38 and then to the tip-ring pair 28, the telephone 30, and the caller identification box 32.

Any analog signals from the telephone 30, or any reflected signal from the telephone 30 or caller identification box 32, is then transmitted back along the tip-ring 28 and through the hybrid circuit 38. The telephone signal is then converted to a digital signal by the analog to digital converter 42. The digital to analog converter 42 provides an intermediate digital signal to the second register 44.

In the preferred embodiment of the invention, for a first predetermined period directly after the first ring signal, such as, for example, approximately 250 milliseconds, the microprocessor 46 replaces the contents of the second register 44 with a quiet code, such as, for example, all "ones." Thereafter, the microprocessor 46 allows the second register 44 to simply transfer, substantially unaffected, the intermediate digital code to the transmit transmission lines 26. When sent substantially unaffected, the intermediate digital code becomes a digital data signal.

The operation of the invention may be understood by referring to FIG. 2. After initial ring, which may last, for example, two seconds, there is typically a four second period of silence before a second ring begins. During the first 250 milliseconds immediately after the first ring, the microprocessor 46 substitutes the quiet code into the second register 44 in lieu of any intermediate digital signals supplied to the second register 44 by the analog to digital converter 42, thus avoiding any reflected or echo signal being sent back to the central office 14 and then back to the customer premises 20. Thus, interference with the caller identification box's operation in reduced.

The interval during which the microprocessor 46 substitutes a quiet code after the first ring may of course, be varied. It may range up to, for example, 400 milliseconds, although substituting the quiet code for the first 250 milliseconds often is sufficient, since the transients on the lines as a result of the ringing have often substantially diminished within the first 250 milliseconds after the first ring stops.

The copy of the source code used by the microprocessor, in the C language, follows.

```
/*****************************  ************************  ******************/
/*                        COPYRIGHT 1991                                   */
/*                      TELTREND INCORPORATED                              */
/*                       ALL RIGHT RESERVED                                */
/*************************************************************************/
/*acomdec.c                                                                */
/*************************************************************************/
/*            APLICATION COMMON DECODER FOR AUR99                          */
/*************************************************************************/
/*apl_common_decoder:                                                      */
/*If there is no CGA or QUIET in progress,the routine will decoder received*/
/*signalling and then format the control byte for SLIC chip. Whenever the  */
/*unit receives the ringing pattern,it will set up 250 ms in which the unit*/
/*will send out the quiet code to the COT end ,right after the remove of   */
/*ringing (Required for Call ID fixed)                                     */
/*************************************************************************/
#include <reg51.h>        /*Franklin 8051 resgister header file */
#include <aportdf.h>      /*Aplication port definition header file */
#include <intrins.h>      /*Franklin 8051 special function header file */
#include <extern.h>       /*Module extern structure and rams file */
#include <avardef.h>      /*Aplication defined constant header file */
include <cvardef.h>      /*Core constant defined header file */ void test_volt_glitch_check();
apl_common_decoder()
{
data char rev_rsig;
data char status;
rev_rsig =(*channel_pointer).old_rsig;
if(CGA_flag | QUIET_flag) /*Check for CGA or QUIET is in progress */
{
      return; /*Yes It is ,Do nothing return */
}
                /*Normal received signalling decoder */
CGA_flag=NO;
QUIET_flag=NO;
TEST_TONE=NO;
rev_rsig= cror_(rev_rsig,4);/*Relocate A,B,C,D bits */
rev_rsig=rev_rsig & keep_low_nibble;   /*Keep only ABCD bits*/
switch(rev_rsig)
{
```

```
case ground_start_0000:
    test_volt_glitch_check();
    forward_disconnect_flag=NO;
    ring_trip_flag=NO;
    voltage_flag=low_voltage;
    if(wait_for_350ms==YES)
    {
        return;
    }
    else
    {
        if((*channel_pointer).old_tsig==OFF_HOOK && loop_flag==NO)
        {
            /*This code takes care dial one problem */
            (*channel_pointer).event_timer=delay_for_350ms;
            wait_for_350ms=YES;
            loop_flag=YES;
            (*channel_pointer).out_to_slc=TIP_OPEN;
        }
        else
        {
            wait_for_350ms=NO;
            loop_flag=NO;
            (*channel_pointer).out_to_slc=TIP_OPEN;
            (*channel_pointer).last_rsig=rev_rsig;
            break;
        }
    }
case channel_test_0101:/* Add later*/
    if(CHANNEL==A_channel)
    {
        if(! DATA04_7)
        {
            A_TEST_ON=YES;
            if(Achannel_rams.last_rsig !=rev_rsig)
            A_GLITCH=YES;
            lca_rams_addr.write_bcl_mode=bclmode | force_service_request;
            (*channel_pointer).out_to_slc=NORMAL;/*001*/
        }
        Achannel_rams.last_rsig=rev_rsig;
        break;
    }
    if(CHANNEL==B_channel)
    {
        if(! DATA04_6)
        {
            B_TEST_ON=YES;
            if(Bchannel_rams.last_rsig !=rev_rsig)
            B_GLITCH=YES;
            lca_rams_addr.write_bcl_mode=bclmode | force_service_request;
            (*channel_pointer).out_to_slc=NORMAL;/*001*/
        }
        Bchannel_rams.last_rsig=rev_rsig;
        break;
    }
case idle_with_tip_0001:
case idle_with_tip_0010:
case idle_with_tip_0011:
case idle_with_tip_0100:
case idle_with_tip_0110:
case idle_with_tip_0111:
case idle_with_tip_1000:
case idle_with_tip_1001:
case idle_with_tip_1100:
case idle_with_tip_1101:
case idle_with_tip_1111:
    test_volt_glitch_check();
    forward_disconnect_flag=NO;
    ring_trip_flag=no_ring_trip;
    (*channel_pointer).out_to_slc=NORMAL;/*010*/
    (*channel_pointer).last_rsig=rev_rsig;
    if(wait_for_350ms==YES || wait_for_2500ms==YES)
    {
        /*After forward disconnect,allowing 30ms delay
          for bridge over,so the loop detector could
          be very much settle.*/
        (*channel_pointer).event_timer=load_30ms_delay;
    }
```

```
        if((*channel_pointer).tpcm_quiet_timer!=EXPIRED) TPCM_QUIET=YES;
        wait_for_350ms=NO;
        wait_for_2500ms=NO;
        loop_flag=NO;
        break;
    case ringing_1011:
    case ringing_1110:
        test_volt_glitch_check();
        (*channel_pointer).last_rsig=rev_rsig;
        forward_disconnect_flag=NO;
        if((ring_trip_flag==YES) || (LOOP==loop_active_low))
        {
            break;
        }
        else
        {
            (*channel_pointer).out_to_slc=RINGING;/*001*/
            (*channel_pointer).tpcm_quiet_timer=
            time_for_quiet_tpcm;/*Call ID fixed requirement */
            voltage_flag=High_voltage;
            wait_for_350ms=NO;
            wait_for_2500ms=NO;
            loop_flag=NO;
            break;
        }
    case forward_disconnect_1010:
        test_volt_glitch_check();
        (*channel_pointer).last_rsig=rev_rsig;
        ring_trip_flag=no_ring_trip;
        voltage_flag=low_voltage;
        if(wait_for_350ms==YES | wait_for_2500ms==YES)
        {
            return;
        }
        else
        {
            if(forward_disconnect_flag) return;
            else
            {
                (*channel_pointer).out_to_slc=TIP_OPEN;
                (*channel_pointer).event_timer=delay_for_350ms;
                wait_for_350ms=YES;
                wait_for_2500ms=YES;
                forward_disconnect_flag=YES;
            }
            return;
        }
    default:
        return;
    }
} void test_volt_glitch_check()
{
        /*After sending channel test to required channel,the
          BCU will come back and ask for channel status.This events
          has to occur in sequence.In order make sure the event
          occured correctly,the channel unit will set GLITCH flag
          bit whenever it received channel test. So if the BCU
          don't come back and check channel test status,this GLITCH
          never clear,eventhough channel test is removed,as the result
          the channel TEST_ON flag will be set forever and channel
          request for test service never clear
        Note :GLITCH flag is clear in message interrupt routine.
        */ if(CHANNEL==A_channel)
    {
        if(A_GLITCH & DATA04_7==NO)
        A_TEST_ON=NO;
    } if(CHANNEL==B_channel)
    {
        if(B_GLITCH & DATA04_6==NO)
        B_TEST_ON=NO;
    }
```

A preferred embodiment of the present invention has been described herein. It is to be understood, of course, that changes and modifications may be made in the preferred embodiment without departing from the true scope and spirit of the present invention, as defined by the appended claims.

We claim:

1. A transmit path limiter for use with a digital transmission line system, said system including a customer loop telephone line and a digital carrier transmission line comprising, in combination:
   an initial ring detector for sensing that a call is coming to said customer loop telephone line and responsively providing an initiation signal;
   an analog to digital converter for accepting an analog telephone signal and converting said telephone signal to an intermediate digital signal;
   a register for receiving said intermediate digital signal and responsively transmitting a digital data signal to said digital carrier transmission line; and
   a controller, interconnected to said initial ring detector, for receiving said initiation signal and substituting therefore a quiet code in said register for a predetermined interval.

2. A limiter as claimed in claim 1 wherein said predetermined interval is less than 400 milliseconds.

3. A limiter as claimed in claim 1 wherein said predetermined interval is within a range of zero to 250 milliseconds.

4. A limiter as claimed in claim 1 further comprising a digital to analog converter for accepting a receive digital data signal from said digital carrier transmission line and responsively providing an analog telephone signal to said customer loop telephone line.

5. A limiter as claimed in claim 1
   wherein said system further includes a ring generator and a switch between said customer loop telephone line and said ring generator,
   wherein said switch is interconnected to said controller, and
   wherein said controller activates said switch to interconnect said ring generator to said customer loop telephone line upon receiving said initiation signal.

6. A limiter as claimed in claim 1
   wherein said system includes a central office having a caller identification generator to transmit a code after sending a first ring signal to said telephone,
   wherein said controller comprises a microprocessor and a read only memory containing a quiet code, and
   wherein, after receiving said initiation signal, said microprocessor places, in said register, said quiet code from said read only memory for said predetermined interval.

7. A limiter as claimed in claim 6 wherein said quiet code is comprised substantially of binary ones and said predetermined interval is within a range of zero to 250 milliseconds.

* * * * *